United States Patent [19]

Fujii et al.

[11] Patent Number: 5,228,109
[45] Date of Patent: Jul. 13, 1993

[54] LIGHT BEAM HEATING APPARATUS AND METHOD UTILIZING A FIBER OPTIC CABLE WITH RANDOM FIBER ARRAY

[75] Inventors: Koji Fujii, Osaka; Makoto Kobayashi, Kawanishi; Shogo Koshida, Osaka; Kozo Yoshimura, Osaka; Hideo Goto, Osaka, all of Japan

[73] Assignees: Matsushita Electric Industrial Co., Ltd.; Sumitomo Electric Industries, Ltd., both of Osaka, Japan

[21] Appl. No.: 746,946

[22] Filed: Aug. 19, 1991

[30] Foreign Application Priority Data

Aug. 24, 1990 [JP] Japan .................. 2-223898
Aug. 24, 1990 [JP] Japan .................. 2-223899
Nov. 30, 1990 [JP] Japan .................. 2-340877

[51] Int. Cl.⁵ .................. G02B 17/00; B23K 3/04
[52] U.S. Cl. .................. 392/419; 219/85.12; 219/85.13; 385/76; 250/227.11; 250/227.28
[58] Field of Search .................. 392/419–421; 219/85.12, 85.13; 385/116–117, 76–79; 250/227.11, 227.28; 362/32; 128/633, 634

[56] References Cited

U.S. PATENT DOCUMENTS

| | | | |
|---|---|---|---|
| 3,596,083 | 7/1971 | Lovering | 362/32 |
| 3,621,198 | 11/1971 | Herbrich | 392/420 |
| 3,649,811 | 3/1972 | Schoenthaler | 219/85.12 |
| 3,717,743 | 2/1973 | Costello | 219/85.12 |
| 3,923,375 | 12/1975 | Bowerman | |
| 4,070,763 | 1/1978 | Carts, Jr. | 362/32 |
| 4,167,746 | 9/1979 | Storm | 357/30 |
| 4,415,240 | 11/1983 | Nishioka et al. | 385/117 |
| 4,860,172 | 8/1989 | Schlager et al. | 362/32 |
| 4,921,326 | 5/1990 | Wild et al. | 385/117 |
| 4,993,802 | 2/1991 | Concannon et al. | 362/32 |
| 4,997,259 | 3/1991 | Ichimura et al. | 250/227.11 |

FOREIGN PATENT DOCUMENTS 0095043 11/1983 European Pat. Off. .
8802175.0 4/1988 Fed. Rep. of Germany .

OTHER PUBLICATIONS

Patent Abstracts of Japan vol. 11, No. 194 (P-588), 23 Jun. 1987; & JP-A-62017705 (Nippoon Kogaku) Jan. 26, 1987.
Patent Abstracts of Japan vol. 12, No. 271 (P-736) 28 Jul. 1988; & JP-A-63053452 (Kanebo Ltd) Jul. 3, 1988.

Primary Examiner—Bruce A. Reynolds
Assistant Examiner—John A. Jeffery
Attorney, Agent, or Firm—Wenderoth, Lind & Ponack

[57] ABSTRACT

A light beam irradiation apparatus includes a light source, a reflector for condensing light emitted from the light source, and a fiber cable for transmitting light reflected by the reflector. The fiber cable accommodates at least one bundle of optical fibers arrayed at random so that a fiber array at its first end differs from that at its second end. The apparatus further includes a lens, mounted on the second end of the fiber cable, for focusing the light on an object to be treated.

3 Claims, 5 Drawing Sheets

LIGHT BEAM HEATING APPARATUS AND METHOD UTILIZING A FIBER OPTIC CABLE WITH RANDOM FIBER ARRAY

BACKGROUND OF THE INVENTION

1. Field of the Invention

The present invention relates to a light beam irradiation (or heating) apparatus and a method for use in local heat-processing wherein light from a light source is condensed by a reflector. The apparatus and method according to the present invention are particularly useful in heating for local soldering, local removal of a film coated on a thin wire of polyurethane, local heat-processing for resins, or the like.

2. Description of the Prior Art

An apparatus for performing local heating is conventionally known wherein light from a light emitting lamp as a light source is condensed by a reflector and is directly applied to a local area of an object.

The light condensed by the reflector spreads to some extent because the light source itself is not an ideal point light source or for to other reasons. For example, when a xenon lamp is used as a light emitting lamp, it has a spread of about 5 mm in diameter even at a location (beam waist) where light therefrom is throttled to the utmost. The distribution of light energy at the beam waist is not uniform. If heating, for example soldering, is performed using light having a non-uniform energy distribution, solder in the area receiving the light beam is not uniformly fused, thereby producing unevenness in its finish.

FIG. 1 depicts a conventionally known fiber cable accommodating a bundle of optical fibers. As shown in FIG. 1, all the optical fibers are arrayed in parallel with one another. This fiber cable is in wide practical use today but is disadvantageous in that the distribution of light energy is not uniform, as discussed later.

In the meantime, light energy required for heat-processing large quantities or resin or the like is less than that required in soldering. Accordingly, the level of light energy to be irradiated must be lowered, thus reducing the utilization of the light beam irradiation apparatus.

When light beam irradiation is utilized in soldering at high temperatures or in removing a film coated on a wire of polyurethane, not only the amount of whole energy to be irradiated but also the energy density at the center is required to be enlarged. However, it has been impossible to accomplish this so far without enlarging the capacity of the light emitting lamp.

SUMMARY OF THE INVENTION

The present invention has been developed to overcome the above-described disadvantages.

It is accordingly an object of the present invention to provide a light beam irradiation apparatus and a method capable of applying uniform light to an arbitrary local area of an object to be treated.

Another object of the present invention is to provide a light beam irradiation apparatus and method capable of simultaneously applying uniform light to a plurality of objects to be treated.

In accomplishing these and other objects, a light beam irradiation apparatus according to the present invention comprises a light source, a reflector for condensing light emitted from the light source, and cable means for transmitting light reflected by the reflector. The cable means has at least one first end for receiving the light reflected by the reflector and at least one second end for emitting the light therefrom, and includes at least one bundle of optical fibers arrayed therein at random so that the fiber array at the first end may differ from that at the second end. The apparatus further comprises a lens, mounted on the second end of the cable means, for focusing the light on an object to be treated.

The random array of the optical fibers in the cable means averages the distribution of light energy at the second end even when the distribution of light energy is not uniform at the first end.

A plurality of branch fiber cables may be branched from an intermediate portion of the cable means to provide simultaneous applications of light to a plurality of locations. The branching of the cable means is particularly useful in enhancing the utility of the apparatus in applications where not much light energy is required.

The cable means may be enlarged in diameter and be so constituted as to accommodate a first bundle of optical fibers and a second bundle of optical fibers coaxially covering the first bundle. Preferably, both the first and second bundles of optical fibers are arrayed at random so that each of them has first and second ends which differ in fiber array from each other. This cable means can transmit an increased amount of light energy and provides a stepped energy distribution wherein the central portion thereof is high in energy density and the portion peripherally thereof is low in energy density. The apparatus provided with this cable means is particularly useful in soldering at high temperatures or in removing a film coated on a wire of polyurethane.

Conveniently, the apparatus further includes a conical mirror, mounted on the second end of the cable means, for reducing the angle of spread of the light emitted from the second end and a reduction optical system for throttling the beam diameter of light reflected by the conical mirror.

The apparatus having this construction can reduce a spread of light energy, thereby enlarging the energy density.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENTS

Figure 2:
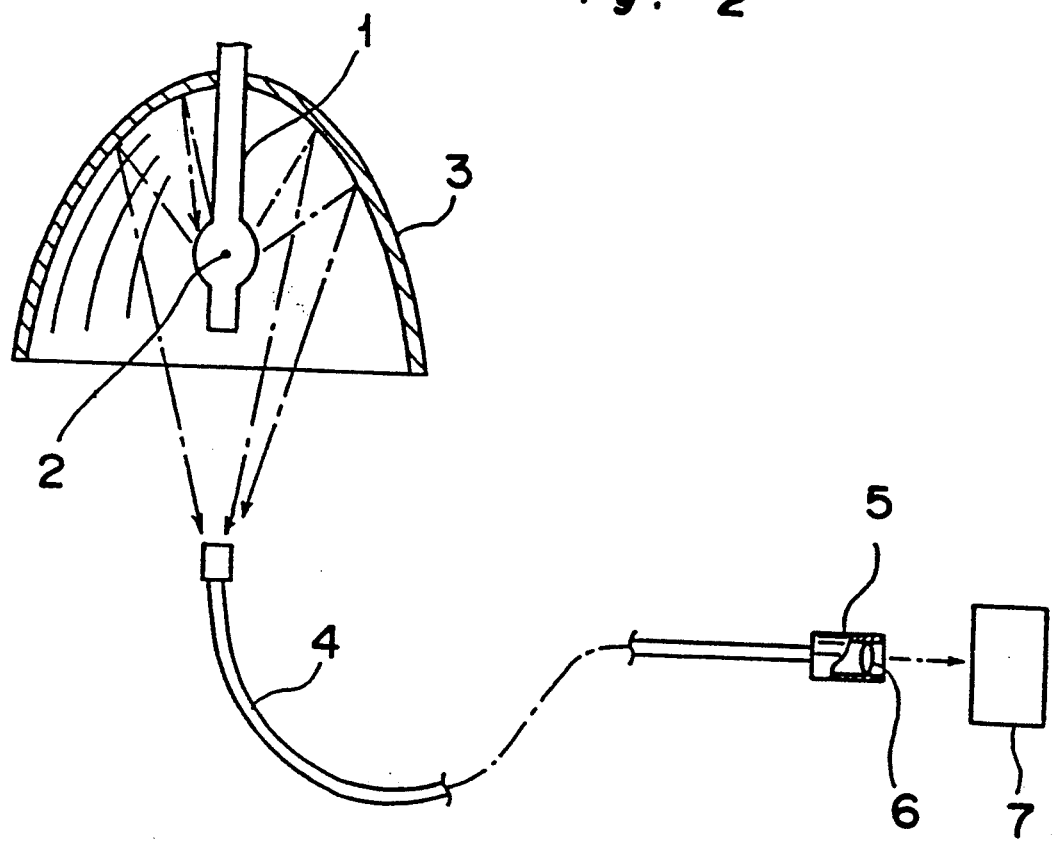
FIG. 2 is a schematic view of a light beam irradiation apparatus according to a first embodiment of the present invention.

Referring now to the drawings, there is schematically shown in FIG. 2 a light beam irradiation apparatus according to a first embodiment of the present invention.

The light beam irradiation apparatus comprises a light emitting lamp 1, a reflector 3 for reflecting light from the light emitting lamp 1 to condense the light, a fiber cable 4 accommodating a bundle of optical fibers, a lens holder 5 secured to one end of the fiber cable 4, and a lens 6 accommodated in the lens holder 5. The light emitting lamp 1 emits light from a light emitting point 2 thereof. An object 7 to be treated is placed so as to be opposed to the lens 6.

Figure 1:
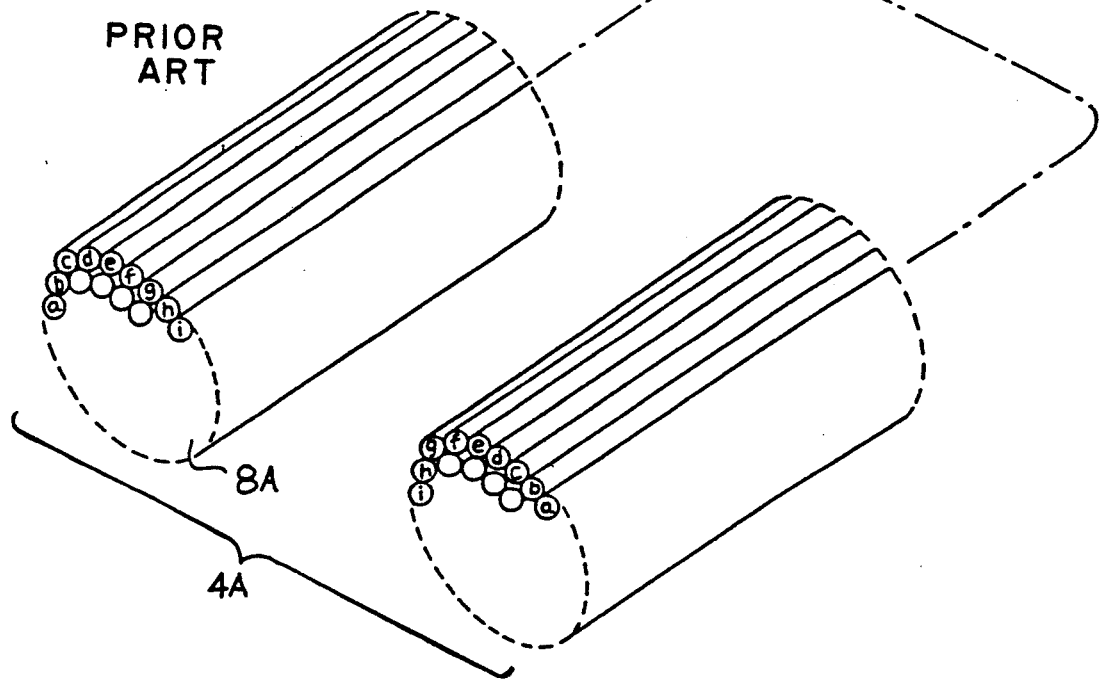
FIG. 1 is a fragmentary perspective view of a conventional fiber cable.
Figure 3:
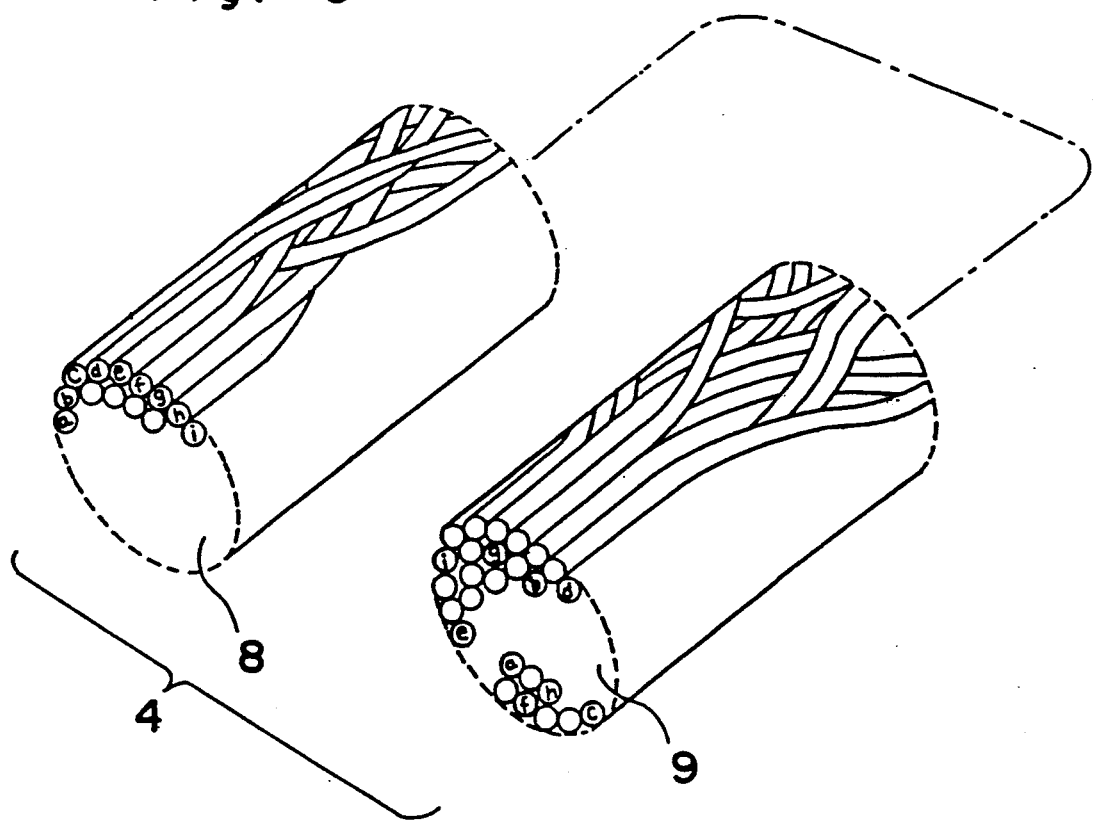
FIG. 3 is a fragmentary perspective view of a fiber cable employed in the apparatus of FIG. 2.

FIG. 3 depicts a fiber cable 4 according to the present invention. Light entering a generally circular inlet end 8 of the fiber cable 4 passes through the fiber cable 4 and is emitted from a generally circular outlet end 9 thereof. As shown in FIG. 3, a bundle of optical fibers are arrayed at random in the fiber cable 4, unlike the optical fibers shown in FIG. 1. Accordingly, the fiber array at the inlet end completely differs from that at the outlet end 9.

Figure 4:
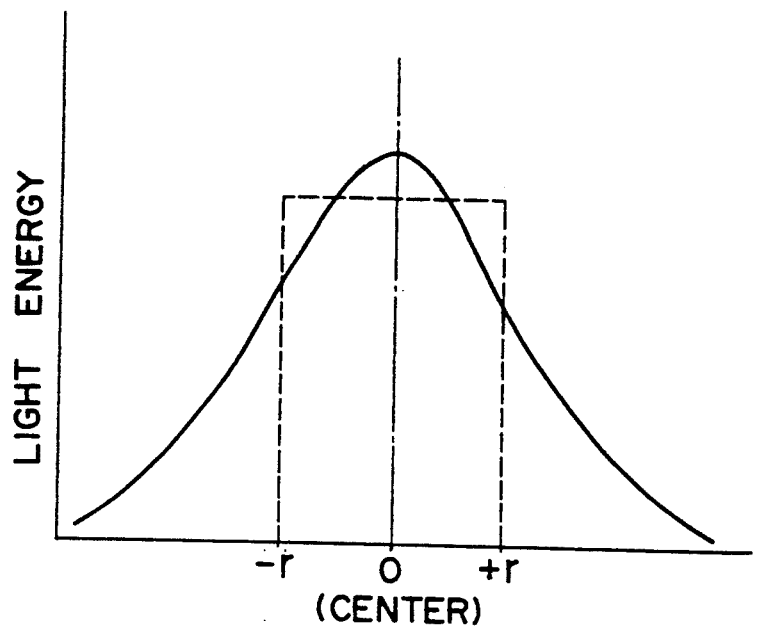
FIG. 4 is a graph indicative of a distribution of light energy at the inlet end and that at the outlet end of the fiber cable of FIG. 3.

FIG. 4 is a graph representative of a distribution of light energy at the inlet end 8 and that at the outlet end 9. In FIG. 4, the former is represented by a solid line whereas the latter is represented by a dotted line. Symbol (r) represents a radius of the fiber cable 4. As shown in the graph of FIG. 4, the distribution of light energy at the outlet end 9 does not become non-uniform, unlike the conventional fiber cable shown in FIG. 1. The random array of the optical fibers in the fiber cable 4 can average the distribution of light energy and provides uniformity of light energy substantially within the limits of the radius (r) of the fiber cable 4.

The fiber cable 4 has flexibility because a number of optical fibers are bundled up therein. Since the lens holder 5 and the lens 6 mounted on one end of the fiber cable 4 are both light, the lens holder 5 along with the lens 6 can be readily incorporated into a small robot so that an object 7 may be heat-processed from an arbitrary direction at an arbitrary location.

Figure 5:
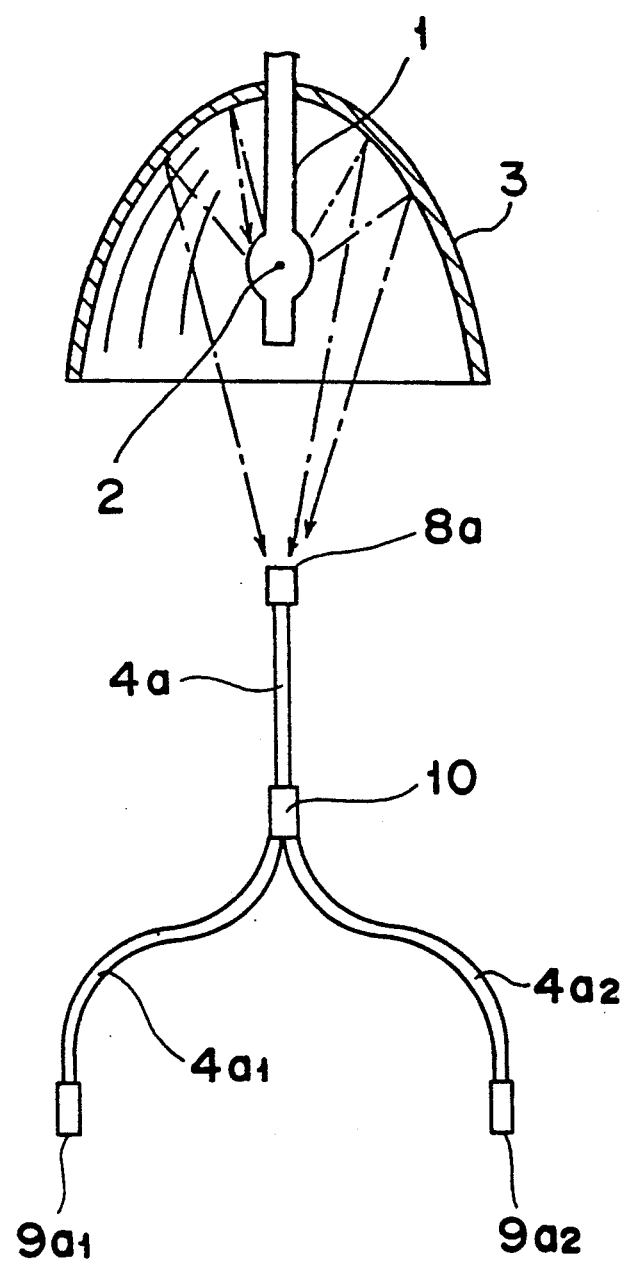
FIG. 5 is a schematic view of a light beam irradiation apparatus according to a second embodiment of the present invention.

FIG. 5 schematically depicts a light beam irradiation apparatus according to a second embodiment of the present invention, which includes one fiber cable 4a and two branch fiber cables 4a1 and 4a2 branched therefrom at a branch point 10. The branch fiber cables 4a1 and 4a2 have respective outlet ends 9a1 and 9a2, from which light entering an inlet end 8a of the fiber cable 4a is emitted.

It is to be noted here that although the apparatus shown in FIG. 5 has two branch fiber cables 4a1 and 4a2, three or more fiber cables can be branched from one fiber cable. Since branching one cable uniformly or at a given ratio can provide plural simultaneous applications of light energy from a single light source, the light beam irradiation apparatus is enhanced in utility.

Figure 6:
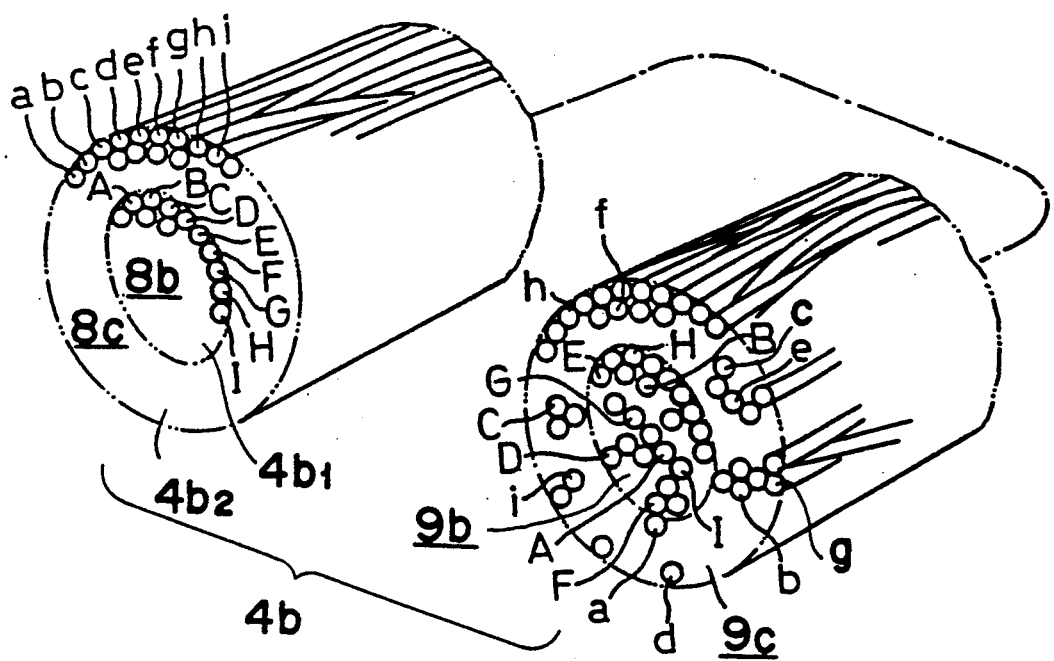
FIG. 6 is a view similar to FIG. 3, indicating a modification of the fiber cable.

The fiber cable 4 shown in FIG. 2 can be replaced by a two-layer fiber cable 4b as shown in FIG. 6. This fiber cable 4b accommodates two bundles 4b1 and 4b2 of optical fibers of which the first bundle 4b1 is coaxially covered with the second bundle 4b2. In each of the two bundles 4b1 and 4b2, the optical fibers are arrayed at random so that the fiber array at an inlet end 8b or 8c may completely differ from that at an outlet end 9b or 9c.

Figure 7:
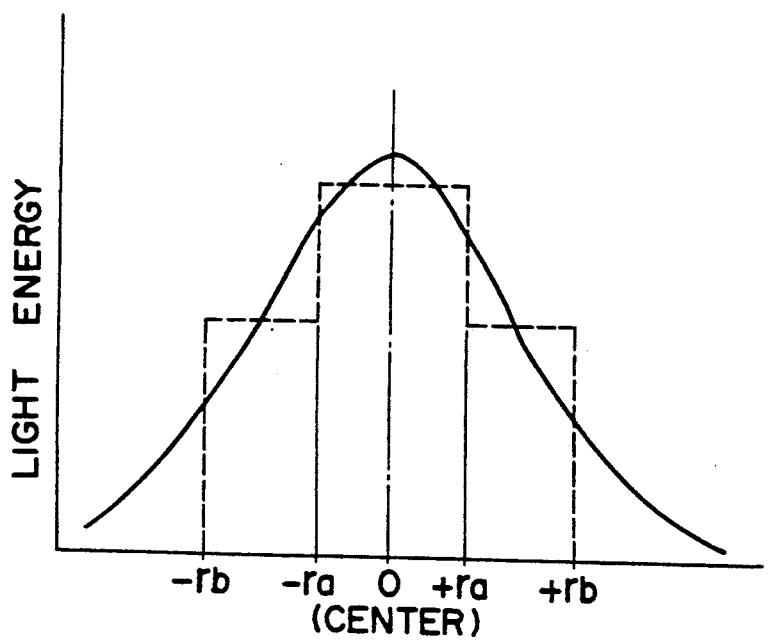
FIG. 7 is a graph similar to FIG. 4, in the case where the fiber cable of FIG. 6 is employed.

FIG. 7 is a graph representative of a distribution of light energy at the inlet ends 8b and 8c and that at the outlet ends 9b and 9c in the two-layer fiber cable 4b shown in FIG. 6. In FIG. 7, the former is represented by a solid line whereas the latter is represented by a dotted line. Symbols ($r_a$) and ($r_b$) represent a radius of the first bundle 4b1 and that of the second bundle 4b2, respectively. FIG. 7 shows a stepped energy distribution wherein the central portion of the fiber cable 4b is high in energy density and the portion peripherally thereof is low in energy density. Accordingly, the fiber cable of FIG. 6 is preferably employed in applications where a large concentrated energy is required, for example, in soldering at high temperatures or in removing a film coated on a wire of polyurethane.

Figure 8:
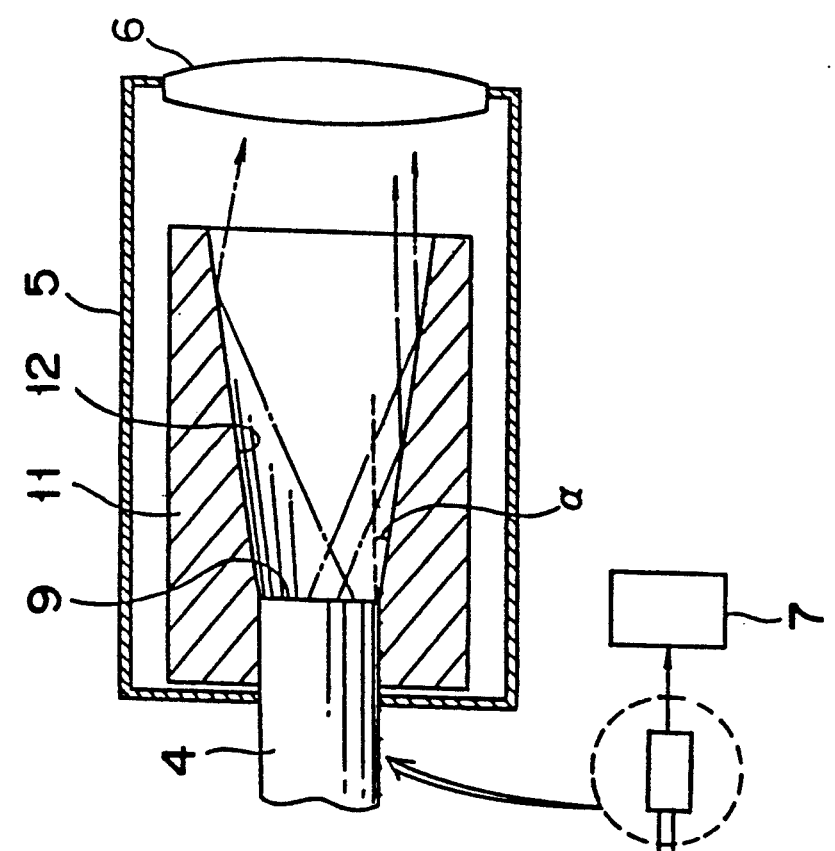
FIG. 8 is a schematic view of a light beam irradiation apparatus according to a third embodiment of the present invention.
Figure 8:
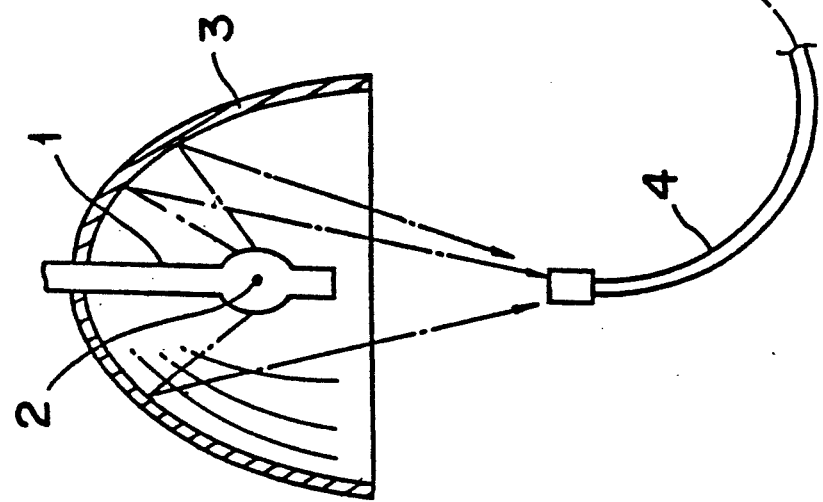

FIG. 8 schematically depicts a light beam irradiation apparatus according to a third embodiment of the present invention, which includes a conical mirror 11, secured to an outlet end 9 of a fiber cable 4 for reducing an angle of spread of light emitted from the outlet end 9, a lens holder 5 secured to the outlet end 9 and covering the conical mirror 11, and a lens 6 securely mounted in the lens holder 5 so as to be opposed to the conical mirror 11. Light emitted from the outlet end 9 radially spreads at an angle (about 20° in this embodiment) determined by a numerical aperture (0.35 in this embodiment) inherent in the fiber cable 4. The light is then reflected by a reflective surface 12 of the conical mirror 11 and enters the lens 6. An angle $\alpha$ of the reflective surface 12 is set to be about half (about 10° in this embodiment) the angle determined by the aforementioned numerical aperture. When light emitted from the outlet end 9 at a maximum angle is reflected by the reflective surface 12 of the conical mirror 11, the light turns to generally parallel rays. Accordingly, even in an optical reduction system wherein the distance between the outlet end 9 and the lens 6 is extended, it is possible to condense almost all light on the lens 6, thereby increasing the energy density of light emitted from the lens 6.

As described above, according to the present invention, the random array of optical fibers in a fiber cable can average the distribution of light energy and can condense the light energy to within predetermined limits, thus making it possible to easily apply uniform light energy to only that area of an object which requires heating. As a result, the surface finish after local soldering becomes good and there is no fear of damage of parts close to the object due to unintended heating of such parts.

Furthermore, the present invention provides the selective use of branched fiber cables, which enables light energy from a single light source to be simultaneously applied to a plurality of locations, thereby enhancing the utility of the light beam irradiation apparatus.

In addition, the use of the two-layer fiber cable having random fiber arrays and the conical mirror enables the application of light energy with a high energy density. As a result, local film removal of a polyurethane wire and soldering at a high temperature can be easily reliably carried out.

Also, since the fiber cable has a flexibility and both the lens and the lens holder are small and light, these members can be easily mounted on a small robot. This fact facilitates the automation of a local heat-processing such as, for example, a local soldering.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A light beam heating apparatus comprising:

a light source;

a reflector for condensing light emitted from said light source;

cable mans for transmitting light reflected by said reflector, said cable means having at least one first end for receiving the light reflected by said reflector and at least one second end for emitting the light therefrom, said cable means comprising at least one bundle of optical fibers arrayed therein at random so that ends of said optical fibers at said first end of said cable means are arrayed randomly relative to ends of said optical fibers at said second end of said cable means;

a lens means, mounted to and positioned directly adjacent said at least one second end of said cable means, for focusing light directly form said at least one second end of said cable means on an object to be treated;

wherein said at least one bundle of optical fibers comprises a first bundle of optical fibers and a second bundle of optical fibers coaxially covering said first bundle of optical fibers;

wherein said first bundle of optical fibers is arrayed at random so that first ends of said optical fibers of said first bundle are arrayed at random relative to second ends of said optical fibers of said first bundle; and wherein said second bundle of optical fibers is arrayed at random so that first ends of said optical fibers of said second bundle are arrayed at random relative to second ends of said optical fibers of said second bundle.

2. The apparatus according to claim 1 wherein said lens means forms part of an optical reduction system for throttling a beam diameter, said optical reduction system further including a conical mirror, mounted on said second end of said cable means, for reducing an angle of spread of the light emitted from said second end of said cable means;

wherein said cable means has a predetermined numerical aperture value which defines a predetermined angle of spread of the light emitted therefrom relative to an axial direction of said cable means; and wherein said conical mirror has a reflective surface disposed at an angle, relative to said axial direction of said cable means, which is about half of said predetermined angle of spread.

3. A local heating method comprising the steps of:

introducing light emitted form a light source into a first end of a fiber able accommodating at least one bundle of optical fibers arrayed at random therein;

reducing an angle of spread of the light emitted from the second end of the fiber cable;

throttling a beam diameter of the light;

after said steps of reducing and throttling, applying uniform light emitted from at least one second end of the fiber cable to at lest one object to be treated;

wherein the fiber cable is a two-layer fiber cable having two bundles of optical fibers of which one bundle is coaxially covered on the other bundle, each bundle of optical fibers being arrayed at random in the fiber cable so that ends of the optical fibers at the first end of the cable are arrayed randomly relative to ends of the optical fibers at the second end of the fiber cable.

* * * * *